United States Patent [19]
Ogino

[11] Patent Number: 5,485,440
[45] Date of Patent: Jan. 16, 1996

[54] OPTICAL INFORMATION RECORDING/REPRODUCING APPARATUS COMPRISING DIGITAL SERVO DEVICE FOR PERFORMING FOCUSING AND/OR TRACKING OF OPTICAL HEAD BASED ON DIGITAL INFORMATION

[75] Inventor: Tsukasa Ogino, Yokohama, Japan

[73] Assignee: Canon Kabushiki Kaisha, Tokyo, Japan

[21] Appl. No.: 446,317

[22] Filed: May 22, 1995

Related U.S. Application Data

[63] Continuation of Ser. No. 351,035, Nov. 28, 1994, abandoned, which is a continuation of Ser. No. 514,320, Apr. 25, 1990, abandoned.

[30] Foreign Application Priority Data

| Apr. 28, 1989 | [JP] | Japan | 1-107762 |
| Apr. 20, 1990 | [JP] | Japan | 2-103055 |

[51] Int. Cl.⁶ ........................................ G11B 7/00
[52] U.S. Cl. ............................ 369/44.34; 369/44.11; 369/44.28; 369/44.26
[58] Field of Search .............. 369/44.27, 44.29, 369/44.34, 44.35, 44.39, 44.11, 60, 44.25, 32, 33, 54, 59, 44.26, 44.28; 360/78.08, 78.09

[56] References Cited

U.S. PATENT DOCUMENTS

| 4,907,214 | 3/1990 | Nagano et al. | 360/78.08 |
| 4,918,676 | 4/1990 | Miyasaka | 369/33 |
| 4,918,680 | 4/1990 | Miyasaka | 369/44.34 |
| 5,105,075 | 4/1992 | Ohta et al. | 250/201.2 |

FOREIGN PATENT DOCUMENTS

| 0249462 | 12/1987 | European Pat. Off. |
| 0292917 | 11/1988 | European Pat. Off. | 369/44.27 |
| 63-121136 | 5/1988 | Japan . |
| 2158611 | 11/1985 | United Kingdom . |

OTHER PUBLICATIONS

Katsuhara, et al., "Fine Seek Technique," Japanese Journal of Applied Physics/Supplements, vol. 26, No. 26-4, 1987, Tokyo, Japan, pp. 191-194.

Primary Examiner—Georgia Y. Epps
Assistant Examiner—Nabil Hindi
Attorney, Agent, or Firm—Fitzpatrick, Cella, Harper & Scinto

[57] ABSTRACT

An optical information recording/reproducing apparatus for recording and/or reproducing information on and/or from an optical memory medium includes an optical system for forming a light beam spot for recording and/or reproducing information on and/or from the optical memos medium, a signal generating unit for detecting a position of the optical system relative to the medium and generating an analog signal corresponding to the detected position, an actuator for driving the optical system, an A/D converter for converting the analog signal from the signal generating unit into a digital signal, a digital signal processing unit for calculating a control amount of the actuator on the basis of a predetermined control process in order to correct the relative position from an output from the A/D converter, and a D/A converter for converting the output from the digital signal processing unit into an analog signal. The actuator is driven in correspondence with the output from the D/A converter. The control process of the digital signal processing unit can be arbitrarily changed.

6 Claims, 4 Drawing Sheets

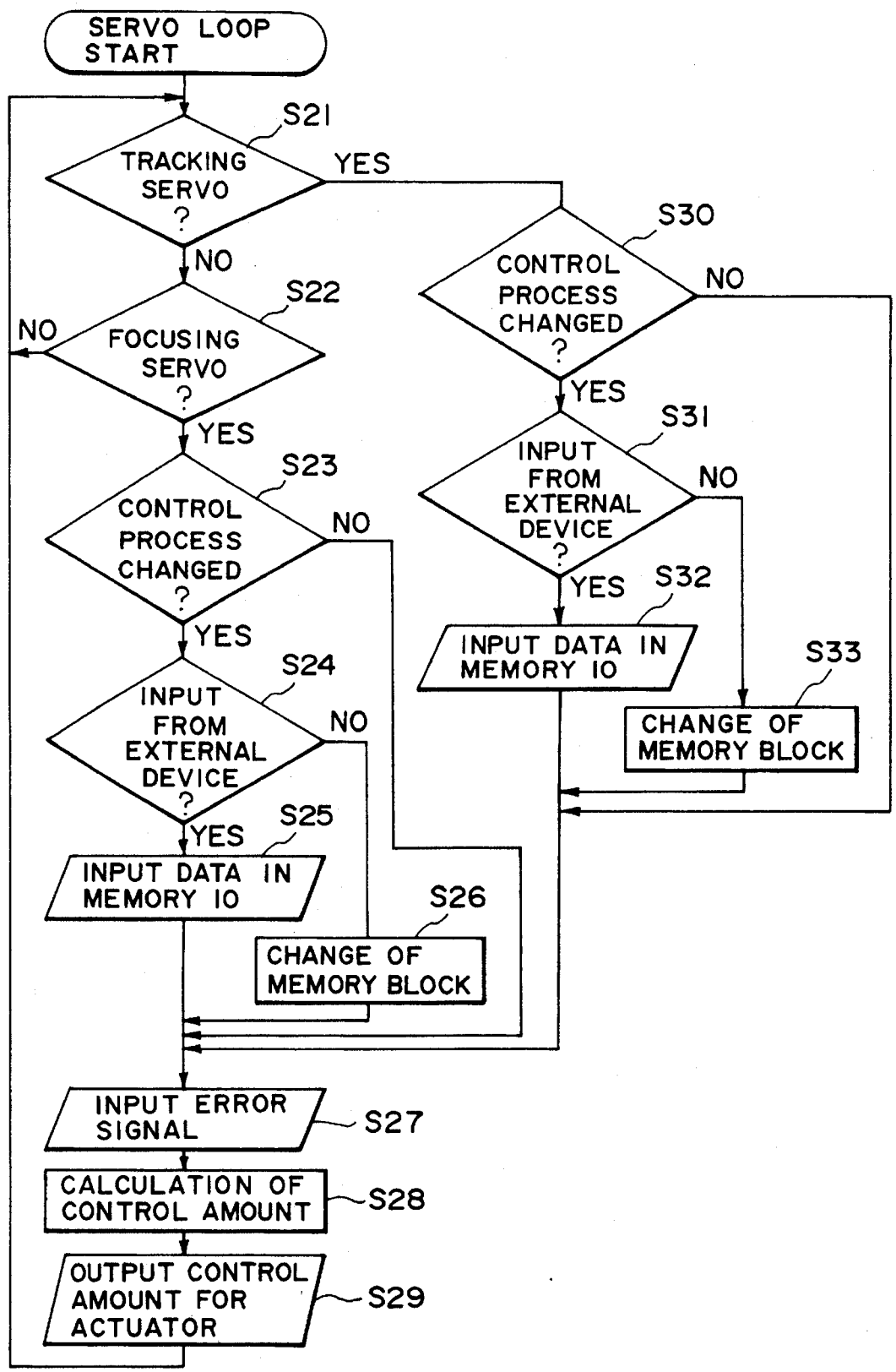
F I G. 5

OPTICAL INFORMATION RECORDING/REPRODUCING APPARATUS COMPRISING DIGITAL SERVO DEVICE FOR PERFORMING FOCUSING AND/OR TRACKING OF OPTICAL HEAD BASED ON DIGITAL INFORMATION

This application is a continuation of application Ser. No. 08/351,035 filed Nov. 28, 1994, which is a continuation of application Ser. No. 07/514,320 filed Apr. 25, 1990, both now abandoned.

BACKGROUND OF THE INVENTION

1. Field of the Invention

The present invention relates to an optical information recording/reproducing apparatus for recording and/or reproducing information on and/or from an optical memory medium such as an optical disk of an optical card, using an optical head and, more particularly, to a digital servo device for performing auto-focus control and auto-tracking control of the optical head in an apparatus of this type.

2. Related Background Art

Tracks are concentrically or spirally formed on an optical disk, and the optical disk is divided into a plurality of sectors in terms of recording of variable length data or an increase in access speed of an optical head. The optical disk is subjected to optical recording/reproduction in units of sectors.

In order to cause the optical head to access each sector or track, the optical head (mainly, an optical system) must be servo-controlled in so-called focusing and tracking directions. A conventional servo control can be made in an analog or digital manner. In particular, in recent years, digital servo control has received a great deal of attention since it can stably operate a servo system. FIG. 1 shows an example of a digital servo control device.

A digital servo device of a conventional optical information recording/reproducing apparatus will be described below with reference to FIG. 1.

The servo device shown in FIG. 1 includes an optical disk 1 as a recording medium, an optical system 2 for an optical head, a tracking error detector 3 for detecting a tracking error signal based on an output from the optical system 2, and a focus error detector 4 for detecting a focus error signal on the basis of an output from the optical system 2. The tracking error detector 3 and the focus error detector 4 can adopt a known detection method in, e.g., an optical disk recording apparatus. The servo device also includes A/D converters 5 for A/D-converting error signals output from the error detectors 3 and 4 into digital signals, a digital signal process circuit 14, D/A converters 11 for converting the digital signals from the signal process circuit 14 into analog signals, and tracking and focus actuators 12 and 13 for driving the optical head 2 in predetermined directions.

The operation of the digital servo device in the optical information recording/reproducing apparatus with the above arrangement will be described below.

When information is to be recorded on or reproduced from the optical disk 1 by the optical system 2, the optical system 2 must be controlled by the focus and tracking actuators 13 and 12. The digital signal process circuit 14 obtains, using predetermined equations, control amounts necessary for accurately controlling the optical system 2 to be in a desired position in accordance with tracking and focus error signals output from the optical system 2. The actuators 12 and 13 are operated by the control amounts obtained by the digital signal process circuit 14.

Japanese Patent Laid-Open No. 63-121136 discloses the same arrangement as the conventional digital servo device described above. This prior art invention also discloses that control parameters (coefficients) corresponding to various conditions (in focusing and tracking modes) and prestored in a memory are read out, as needed, and calculations are performed using the readout parameters so that the frequency characteristics of a servo system optimally and at all times matches with actuators.

However, in the conventional digital servo device described above, a basic control process (equations) is permanently set (programmed) in the digital signal process circuit. (In the arrangement disclosed in Japanese Patent Laid-Open No. 63-121136, the basic control processes, i.e., equations, are permanently set in a DSP 38. Only coefficients of the equations can be changed according to the conditions. For example, in an equation $y = a_n x^2 + b_n x + c_n$, only the coefficient portions $a_n$, $b_n$, and $c_n$ can be changed.) More specifically, one control process is caused to have redundancy in correspondence with all possible conditions. When an optical disk having different reflectance characteristics is used, or when an optical disk having a different track intervals or sector formats is used, the digital signal process circuit shown in FIG. 1 must use different control processes, or the actuators cannot be properly controlled. It is impossible to cope with various conditions by only the coefficients of the equations.

Some host machines (not shown) for controlling an optical disk device have different minimum recording lengths for the optical disks. In order to achieve optimal tracking, the control process used in the digital signal process circuit 14 shown in FIG. 1 must be changed. As described above, however, since the control process cannot be changed, the actuators cannot be properly controlled.

The control process is left unchanged between focusing and/or tracking servo is led in (or set up) before an operation is started (transient operation) and when a servo loop is closed after the servo is led in (steady operation) although these operation states require different control processes. As a result, optimal servo control cannot be performed in these operation states.

Furthermore, if the same control process is employed in both the focusing and tracking servo operations, optimal servo control is disturbed in these operations.

SUMMARY OF THE INVENTION

The present invention has been made in consideration of the above situation, and has as its object to provide a digital servo device in an optical information recording/reproducing apparatus which can execute an optimal control process corresponding to the operation environment and type type of optical memory medium such as an optical disk, and has high versatility.

In order to achieve the above object, there is provided an optical information recording/reproducing apparatus for recording and/or reproducing information on and/or from an optical memory medium such as an optical disk, comprising:

an optical system for forming a light beam spot for recording and/or reproducing information on and/or from the optical memory medium;

signal generating means for detecting the position of the optical system relative to the medium and generating an analog signal corresponding to the detected position;

an actuator for driving the optical system;

A/D conversion means for converting the analog signal from the signal generating means into a digital signal;

digital signal processing means for calculating a control amount of the actuator from an output from the A/D conversion means on the basis of a predetermined control process in order to correct the relative position; and D/A conversion means for converting the output from the digital signal processing means into an analog signal, The actuator is driven in correspondence with the output from the D/A conversion means, The control process of the digital signal processing means can be arbitrarily changed, The above and other objects and features of the present invention will be apparent from the description of the preferred embodiments,

BRIEF DESCRIPTION OF THE DRAWINGS

FIG. 5 is a flow chart showing an operation of a digital servo device according to a second embodiment of the present invention.

DETAILED DESCRIPTION OF THE PREFERRED EMBODIMENTS

An embodiment of a digital servo device according to the present invention will be described in detail below with reference to the accompanying drawings.

As an embodiment of the digital servo device of the present invention, a digital servo device using an optical disk medium will be discussed.

Figure 2:
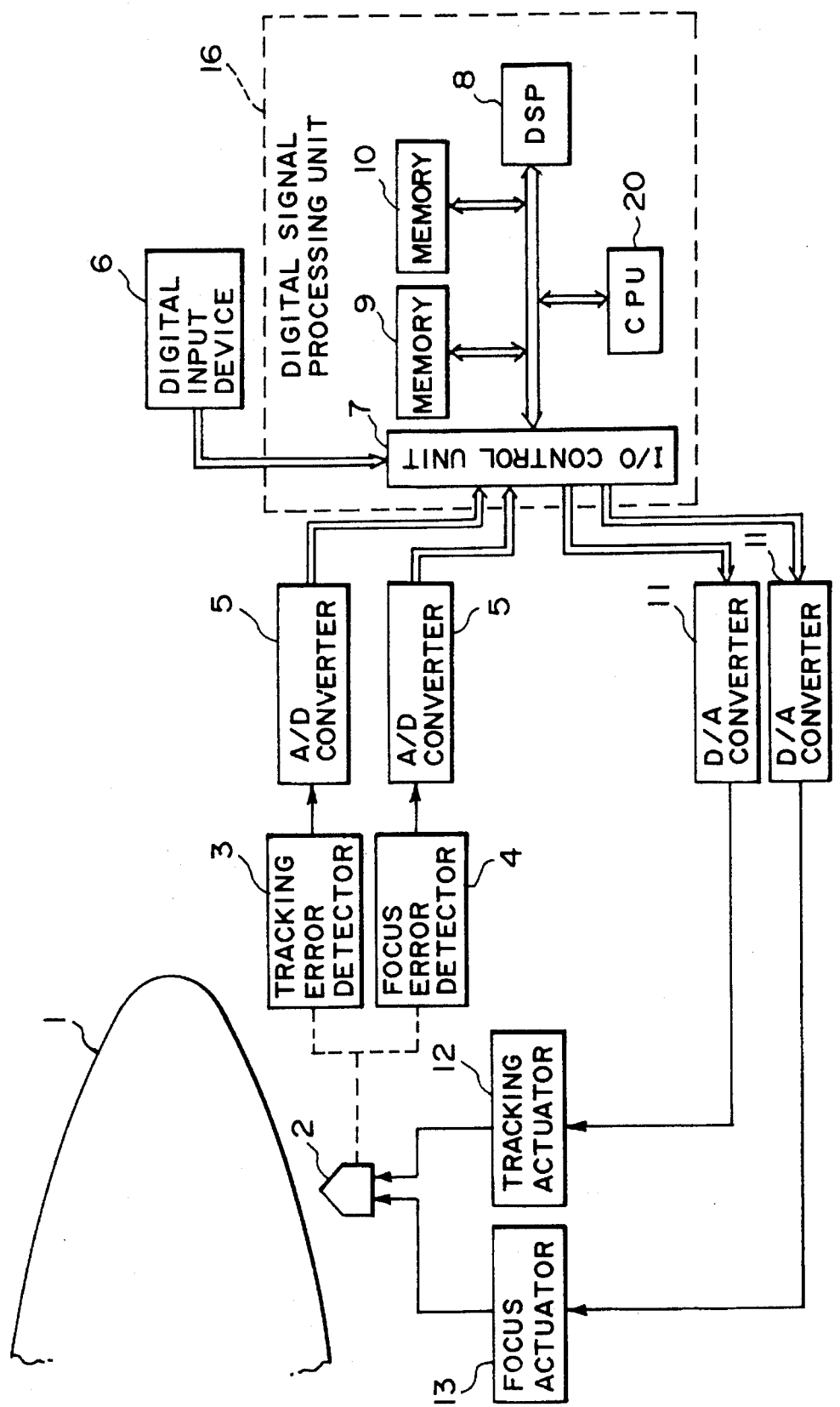
FIG. 2 is a schematic block diagram of a digital servo device according to a first embodiment of the present invention.

FIG. 2 is a schematic block diagram showing an arrangement of the digital servo device.

The digital servo device shown in FIG. 2 includes a digital signal processing unit 16, an input/output control unit (to be referred to as an I/O control unit hereinafter) 7, a digital signal processor (to be abbreviated to as a DSP hereinafter) 8, memories 9 and 10, an external data input device 6, and a CPU 20 for systematically controlling the digital signal processing unit 16. Note that an optical system 2, a tracking actuator 12, a focus actuator 13, a tracking error detector 3, a focus error detector 4, A/D converters 5, and D/A converters 11 are the same as those in a conventional device.

The external data input device 6 is used to externally input a control process, and comprises, e.g., a disk drive device, or a ROM. The memories 9 and 10 serve as means for storing the input control process. The DSP 8 processes only calculations when control amounts of the actuators 12 and 13 are calculated based on the outputs from the A/D converters 5. For example, the DSP 8 is used to perform predetermined calculations in accordance with the control processes (equations) stored in the memories 9 and 10. The I/O control unit 7 controls data input of the data input device 6, digital inputs of the A/D converters, 5, and input/output of calculated digital outputs under the control of the CPU 20.

An example of the control process stored in the memory will be briefly described below with reference to FIG. 3.

Figure 3:
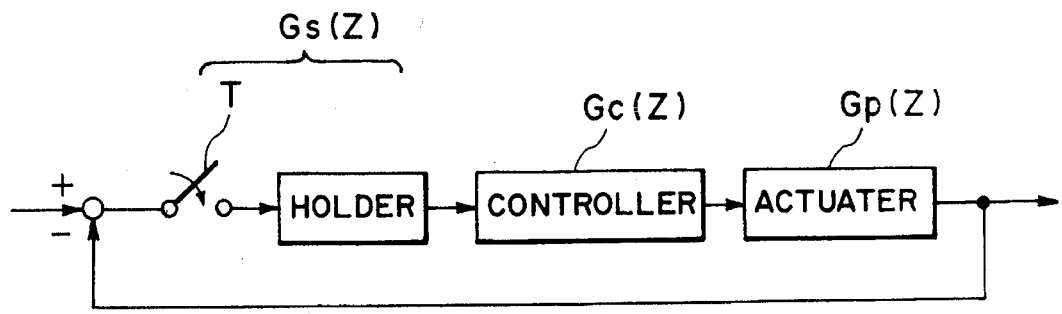
FIG. 3 is a schematic diagram for explaining a control process stored in a memory shown in FIG. 2.

FIG. 3 is a block diagram of a tracking servo loop of the digital servo device. A sampler and a holder Gs(Z) correspond to the A/D converter 5 shown in FIG. 2, and Gp(Z) corresponds to the tracking actuator 12 shown in FIG. 2.

In order to obtain desired servo characteristics (frequency characteristics, and the like), Gc(Z) is designed. In this process, when Gc(Z) is calculated by the DSP, programs for calculations are allocated in the memories 9 and 10 shown in FIG. 2.

For example, the memory 9 stores a quadratic equation given by:

$$Gc2(Z)=(b_0+b_1Z^{-1}+b_2Z^{-2})/(a_0+a_1Z^{-1}+a_2Z^{-2}) \qquad (1)$$

The memory 10 stores a cubic equation given by:

$$Gc3(Z)=(b_0+b_1Z^{-2}+b_2Z^{-2}+b_3Z^{-3})/(a_0+a_1Z^{-2}+a_2Z^{-2}+a_2Z^{-2}+a_3Z^{-2}) \qquad (2)$$

In this case, parameters $a_n$ and $b_n$ are different from each other.

Therefore, loop transfer characteristics shown in FIG. 3 are expressed in two ways as follows:

$$G(Z)=Gs(Z).Gc2(Z).Gp(Z) \qquad (3)$$

$$G(Z)=Gs(Z).Gc3(Z).Gp(Z) \qquad (4)$$

Thus, the program stored in one of the memories 9 and 10 is selected, thereby selecting optimal tracking servo characteristics for the operation environment.

In this embodiment, quadratic and cubic controllers are shown. However, various controllers having other numbers of order may be prepared.

The operation of the digital servo device for an optical disk with the above arrangement will be described below.

Figure 4:
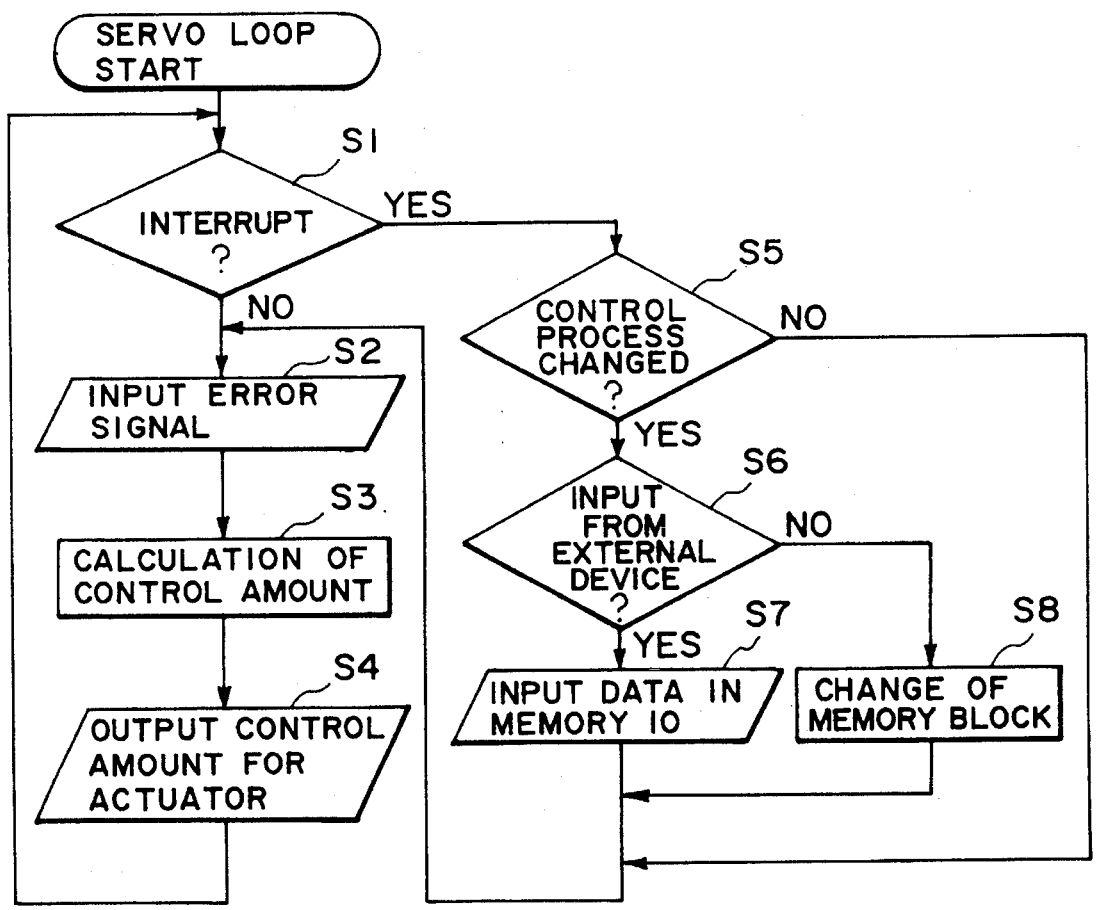
FIG. 4 is a flow chart showing the operation of the embodiment shown in FIG. 2.

FIG. 4 is a flow chart of the operation in the servo loop mode.

The operation of the servo device in a reproduction mode will be described below with reference to FIGS. 2 and 4. A light beam is radiated onto the optical disk 1 through the optical system 2. A light beam reflected by the optical disk 1 is incident on the optical system 2, and a tracking error signal is detected from the incident light beam by the tracking error detector 3. A focus error signal is detected from the incident light beam by the focus error detector 4. The tracking and focus error signals are respectively converted to digital signals by the A/D converters 5, and the digital signals are to the DSP 8 through the I/O control unit 7 (step S2). The DSP 8 calculates control amounts according to the control process stored in the memory 9 (step S3). The calculation result is output to the D/A converters 11 through the I/O control unit 7 (step S4). Each control amount converted to an analog amount by the D/A converter 11 is input to the tracking actuator 12 or the focus actuator 13, thereby performing tracking or focusing servo. The basic servo control flow has been described above.

When an operation environment is varied as in a case wherein an optical disk medium having different characteristics is used, the servo loop is interrupted by a predetermined external interrupt means (step S1). As the external interrupt means, a switch arranged on the device may be depressed by a user himself according to a type of recording medium, or a signal representing a required control process may be recorded in advance on a recording medium itself, so that the signal is read by a recording and/or reproducing light beam, and an interrupt instruction is generated according to the read value.

When the servo loop is interrupted (YES in step S1), it is checked if the control process is to be changed (step S5). When the servo control process is to be changed (YES in step S5), the I/O operation of the I/O control unit 7 by the DSP 8 is stopped. It is checked if an external input is made by the data input device (step S6). This input is to check if the control process to be subjected to processing has already been registered in the memory. If the control process has already been registered, the control process registered in the memory 10 is selected to change a memory block to be used (step S8). If no control process is registered, a message indicating this is displayed for a user, and data of the control process is input from the external data input device 6 to the memory 10 through the I/O control unit 7, thereby creating a new memory block, and making control based on the new memory block (step S7).

In this embodiment, the digital signal process unit 16 has two blocks of memories. More memory blocks may be arranged so that various control processes can be selected. In this case, the effect of the present invention can be sufficiently provided.

The external data input device 6 is omitted, and a plurality of control processes to be used may be stored in a plurality of memories (ROMs).

The series of operations described above are managed by the CPU 20.

A second embodiment of the present invention will be described below.

In the second embodiment, a process of an operation for changing a control process from the case where focusing and/or tracking servo is set up before a focusing and/or tracking servo operation is started (transient operation) to the case where a servo loop is closed after the servo, is set up (steady operation) will be described below. The flow of the operation for, e.g., focusing servo, will be described below with reference to FIGS. 1, 2, and 3. The CPU 20 selects a memory which stores an equation for setting up focusing servo on the basis of a recording and/or reproducing operation start instruction from a host computer (not shown). In this case, the memory 9 is assumed to a memory to be selected.

In the setup mode, the DSP 8 is operated according to the content of the memory 9. When the setup operation is completed, the servo loop is interrupted based on a signal indicating completion of the setup operation (YES in step S1). It is checked if a control process is to be changed (step S5). In this case, since an operation state is changed from the transient operation to the steady operation, the control process is changed (YES in step S5). It is checked if there is an external input (step S6). If no control process for the steady operation is registered in the memory 9 or 10, the CPU 20 signals a message indicating this to an external user, and an external input is made (step S7). A desired control process is then selected (step S7 or S8), and desired control is started.

In this embodiment, equation (1) described above is used in the transient operation mode, and equation (2) described above is used in the steady operation mode. The difference between equations (1) and (2) is as follows. That is, equation (1) is a quadratic equation for high-frequency characteristics with a high gain, and can provide a good transient response. Equation (2) is a cubic equation obtained by multiplying a linear equation for compensating for a gain of only a low-frequency range with a quadratic equation with a lower gain than that of equation (1), and has better steady characteristics than the transient response.

A third embodiment of the present invention will be described below.

Figure 1:
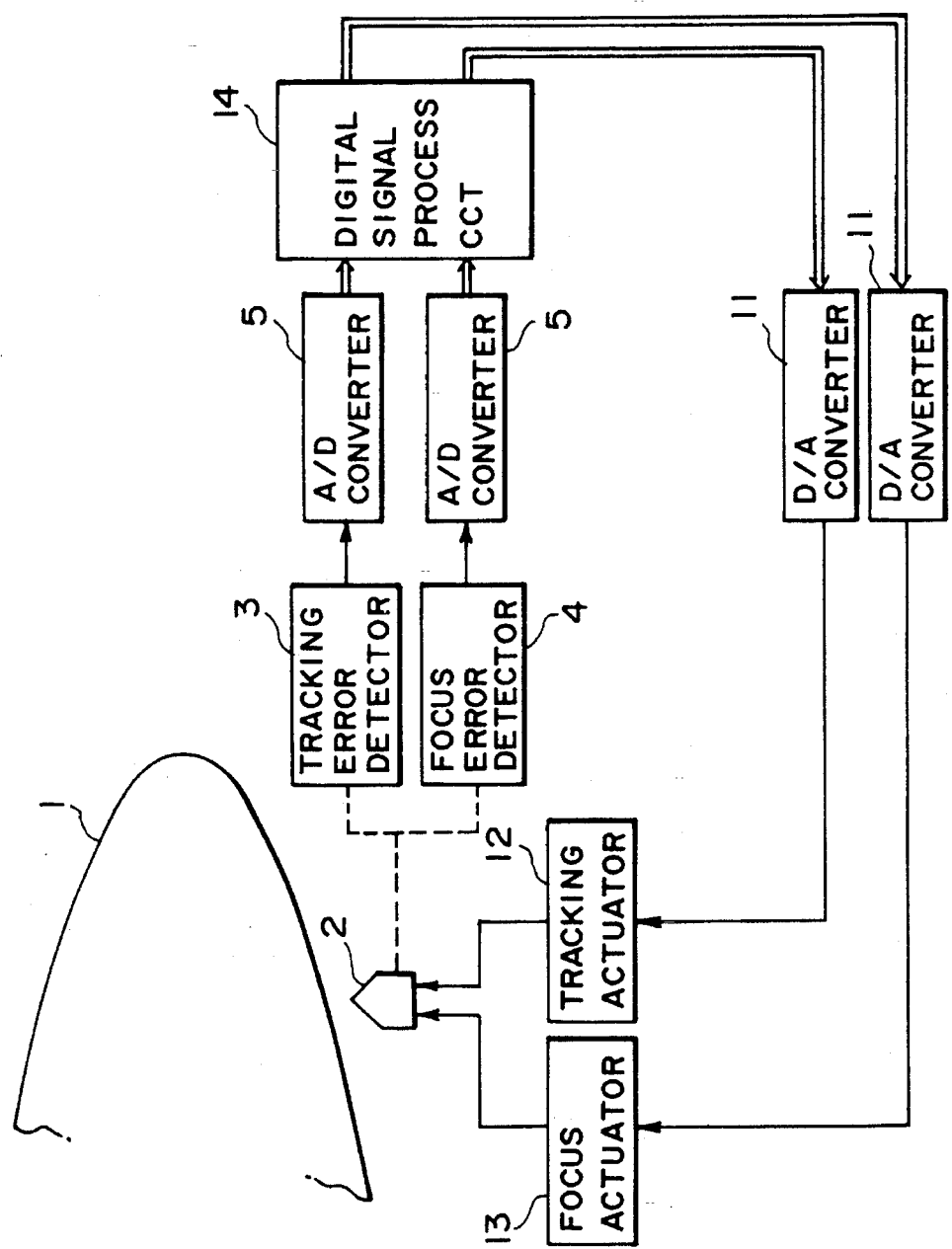
FIG. 1 is a schematic block diagram showing a conventional digital servo device.

When a digital signal processing unit is commonly used by focusing and tracking servo loops like in FIG. 1 (although this device has lower cost), tracking servo and focusing servo cannot be simultaneously operated. Therefore, focusing servo and tracking servo are time-divisionally controlled. In this case, the control process of the DSP 8 is changed when focusing servo control and tracking servo control are switched.

The flow of the operation will be described below with reference to FIGS. 1, 2, and 5.

The focusing servo loop has already been operated in accordance with the content of the memory 9 storing a desired equation.

Assume that a host computer (not shown) issues a tracking servo operation instruction. The CPU 20 controls the I/O control unit to operate a tracking servo operation (YES in step S21). It is checked if a control process must be changed (step S30). If YES in step S30, it is checked if there is an external input (step S31). If there is an external input, the external input is stored in the memory 10 (step S32). The memory 10 storing the desired control process is then selected (step S32 or S33).

The DSP 8 performs calculations based on the equation stored in the memory 10, and a predetermined operation is performed (steps S27 to S29). In the third embodiment, since the focusing and tracking servo loops are time-divisionally controlled, the next operation jumps to step S22 and subsequent steps. The following operation is performed in the same manner as in the operation of the tracking servo loop.

In the third embodiment, equations of the focusing and tracking servo loops are not particularly limited.

Various changes and modifications of the invention may be made within the spirit and scope of the invention.

What is claimed is:

1. An optical information recording/reproducing apparatus for effecting at least one of recording and reproducing of information on/from an optical information recording medium having a plurality of tracks by employing a light beam, comprising:

an optical system for irradiating a desired track on the recording medium with the light beam;

tracking and focusing error detecting means for detecting tracking and focusing errors of the light beam with respect to the desired track and for outputting an analog signal corresponding to the tracking and the focusing errors;

a tracking and focusing actuator for moving at least a part of said optical system in order to move the light beam with respect to the desired track on the recording medium and to adjust a focusing state of the light beam with respect to the recording medium;

A/D conversion means for converting the analog signal output from said tracking and focusing error detecting means into a digital signal;

calculating means for calculating a control amount of said tracking and focusing actuator by processing the digital signal converted by said A/D conversion means on the basis of a predetermined calculation equation in order to correct the tracking and focusing errors of the light beam, said calculating means outputting a digital signal;

memory means for storing a plurality of calculation equations each having a different order which are employed by said calculating means and correspond to a plurality of operation states or operation environments of said apparatus; and D/A conversion means for converting the digital signal output from said calculating means into an analog signal, wherein said tracking and focusing actuator is driven ill accordance with the analog signal output from said D/A conversion means, and said calculating means selects a calculation equation having an order different from that of the calculation equation which is being employed among said plurality of calculation equations each having a different order stored in said memory means, in accordance with a variation in the operation state or operation environment of said apparatus, said calculating means performing a calculation on the basis of the selected calculation equation.

2. An apparatus according to claim 1, further comprising data input means connected to said memory means, wherein the calculation equation stored in said memory means is rewritten by the data input means.

3. An apparatus according to claim 1, wherein said memory means comprises a plurality of memory portions, and the plurality of calculation equations are stored in the memory portions each differing each other, respectively.

4. An apparatus according to claim 1, wherein the selection of the calculation equation by said calculation means is effected upon the performing of a tracking operation and focusing operation.

5. An apparatus according to claim 1, wherein the selection of the calculation equation by said calculating means is effected when the recording medium having a different reflectance is used.

6. An apparatus according to claim 1, wherein the selection of the calculation equation by said calculating means is effected before tracking and/or focusing operation and upon the operation.

* * * * *

UNITED STATES PATENT AND TRADEMARK OFFICE
CERTIFICATE OF CORRECTION

PATENT NO. : 5,485,440
DATED : January 16, 1996
INVENTOR(S) : TSUKASA OGINO

It is certified that error appears in the above-indentified patent and that said Letters Patent is hereby corrected as shown below:

ON THE TITLE PAGE:

[57] ABSTRACT

Line 5, "memos" should read --memory--.

SHEET 3 OF THE DRAWINGS

FIGURE 3

"ACTUATER" should read --ACTUATOR--.

COLUMN 1

Line 19, "of" should read --or--.

COLUMN 2

Line 12, "matches" should read --match--, and "actuators" should read --the actuators--.

Line 20, "changed.)" should read --changed.--.

UNITED STATES PATENT AND TRADEMARK OFFICE
CERTIFICATE OF CORRECTION

PATENT NO. : 5,485,440
DATED : January 16, 1996
INVENTOR(S) : TSUKASA OGINO

It is certified that error appears in the above-indentified patent and that said Letters Patent is hereby corrected as shown below:

COLUMN 2 (Continue)

Line 21, "have-" should read --have--.

Line 24, "a" should be deleted.

Line 33, "disks, In" should read --disks. In--.

Line 38, "between" should read --when--.

COLUMN 3

Line 9, "signal," should read --signal.--.

Line 11, "means, The" should read --means. The--.

Line 12, "changed," should read --changed.--.

Line 15, "embodiments," should read --embodiments.--.

Line 48, "to" (second occurrence) should be deleted.

UNITED STATES PATENT AND TRADEMARK OFFICE
CERTIFICATE OF CORRECTION

PATENT NO. : 5,485,440
DATED : January 16, 1996
INVENTOR(S) : TSUKASA OGINO

It is certified that error appears in the above-indentified patent and that said Letters Patent is hereby corrected as shown below:

COLUMN 4

Line 8, "designed" should read --designated--;

Line 19, "$+a_2z^{-2}$" (first occurrence) should be deleted and "$+a_3z^{-3}(2)$" should read --$+a_3z^{-3})(2)$--.

Line 48, "are to" should read --are input to--.

COLUMN 7

Line 4, "ill" should read --in--.

COLUMN 8

Line 4, after "each" (first occurrence) insert --from--.

Signed and Sealed this

Sixth Day of August, 1996

*Attest:*

BRUCE LEHMAN

*Attesting Officer*   Commissioner of Patents and Trademarks